United States Patent [19]
DeMarco

[11] 3,811,830
[45] May 21, 1974

[54] STABLE OIL-IN-WATER EMULSION HAIR DYE COMPOSITION

[75] Inventor: Richard DeMarco, Cedar Heights, Conn.

[73] Assignee: Clairol Incorporated, New York, N.Y.

[22] Filed: Apr. 5, 1971

[21] Appl. No.: 131,426

[52] U.S. Cl............................ 8/10.1, 8/10, 8/85, 8/88, 8/93, 424/70, 424/71
[51] Int. Cl............................................ A61k 7/12
[58] Field of Search............... 8/85, 88, 93, 10, 10.1

[56] References Cited
UNITED STATES PATENTS

| | | | |
|---|---|---|---|
| 2,643,211 | 6/1953 | Den Beste | 8/10.1 X |
| 2,983,651 | 5/1961 | Seemuller | 8/10.1 |
| 3,098,013 | 7/1963 | Austin et al. | 8/10.1 |
| 3,194,735 | 7/1965 | Brechner | 8/10.1 |
| 3,206,363 | 9/1965 | Lecher et al. | 8/10.1 |
| 3,436,167 | 4/1969 | Kalopissis et al. | 8/10.1 |
| 3,449,056 | 6/1969 | Pum | 8/10.1 |
| 3,480,377 | 11/1969 | Lyons | 8/10.1 |
| 3,619,102 | 11/1971 | Zviak et al. | 8/10.1 |

Primary Examiner—Albert T. Meyers
Assistant Examiner—Vera C. Clarke
Attorney, Agent, or Firm—Irving Holtzman; George A. Mentis; David J. Mugford

[57] ABSTRACT

A hair dye composition in the form of an oil-in-water emulsion in which the dye is dissolved or finely dispersed in the oil phase. The composition contains a coupling agent (e.g., water soluble alkylene glycols or alkylene glycol ether alcohols; long-chain fatty acid soaps; or long-chain fatty compound polyoxyalkyl or polyhydroxyalkyl derivatives) which imparts stability to the emulsion. The composition may contain a propellant and be dispensed from an aerosol container.

13 Claims, No Drawings

STABLE OIL-IN-WATER EMULSION HAIR DYE COMPOSITION

This invention relates to hair dye compositions and, more particularly, to clear, stable, aqueous hair dye compositions containing intimately dispersed therein a hair dye which, for all practical purposes, is insoluble in water i.e., which has a solubility in water which is no greater than about 0.3 percent. This invention concerns, moreover, dye compositions of the above character that are suitable for use in direct dyeing of hair on the head, that is, which does not require the use of an oxidizing agent to develop the color. The latter, by distinction, is known in this art as oxidation dyeing.

There is an obvious advantage of being able to dye hair from an aqueous medium employing dyes which are insoluble in water. Such dyes would have a greater affinity for the hair than for the medium, and would dye the hair more strongly than water-soluble dyes. Secondly, these dyes would resist being washed out during shampooing after the dyeing treatment. Moreover, for economical and reasons of convenience, an aqueous medium is the medium of choice.

In adapting water-insoluble dyes for dyeing from aqueous systems the problem is not one of simply modifying the aqueous medium to increase the solubility of the dye therein. Merely increasing the solubility of the dye in the medium often gives a situation wherein the dye has more affinity for the medium than for the hair, which results in a decrease in the dyeing efficiency of the composition.

In an effort to avoid this, water-insoluble dyes have been incorporated into aqueous systems by way of oil-in-water emulsions in which the dye is contained in the oil phase. The oil is selected so as to be insoluble in water, but nevertheless to be dispersible therein. It is also chosen so as to be a good solvent for the dye or at least one to be capable of serving as a medium in which the dye is intimately dispersed so as to be tantamount to a solution of the dye in oil. It is postulated that in this system the solution or fine dispersion of dye in the oil phase serves as a dye reservoir. During the dyeing operation, the dye is thought to be transported from this reservoir into the aqueous phase as the minute quantity of dye contained in said aqueous phase is depleted. A dye concentration gradient is thus maintained between the oil phase and aqueous phase. However, the solubility of the dye in the aqueous phase should never attain a level at which the dye has greater affinity for the aqueous phase than the hair so that there will be no loss of dyeing efficiency.

Although the above described system is theoretically sound, in practice it has been found to have several disadvantages. One disadvantage is that on standing the compositions separate into an aqueous and a dye-containing oil phase. Efforts have been made to minimize this separation by including certain anionic surfactants in the composition. However, it has been found that when sufficient anionic surfactant is added to prevent the separation there also results a corresponding reduction in the dyeing efficiency of the composition.

Another disadvantage of these former compositions is that only a limited amount of dyeing is possible from them since only a limited amount of dye can be incorporated into these systems. This is a severe drawback since it limits the ability to obtain proper dye coverage of the hair particularly with the darker shades.

It has now been found that the above-mentioned disadvantages can be avoided by incorporating in this composition an agent referred to herein as a "coupling agent." This agent may be a single component or a combination of components and is characterized by the fact that it is partly soluble in both the aqueous and oil phase. This results in a clear, stable, homogeneous oil-in-water emulsion in which the dye-containing oil phase is present as a discontinuous phase of particles or droplets of microscopic or sub-microscopic size. The "coupling agent" is further characterized by the fact that although it is partly soluble in water, it is not of such a character as will affect the solubility of the dye in the aqueous phase to the extent that the affinity of the dye for the aqueous phase decreases the dyeing efficiency of the composition.

There is no need to shake the compositions of this invention before use, nor do they separate into two phases on standing, because they retain their homogeneous form over long periods of time. Moreover, in these compositions the dyeing efficiency (strength of dyeing for a given amount of dye) is increased over prior art compositions. Still further, it is possible to incorporate as much as 2 or 3 times as much dye in the present system as compared with prior compositions.

The compositions of this invention may take a variety of forms and may be applied in various manners. Thus, for example, they may be prepared as simple liquids or lotions which are applied directly to the head from a bottle or other like container. However, these compositions are particularly amenable for incorporation in an aerosol system since in such systems the separation of phases is a particular disadvantage and poorly dispersed dye particles could clog the orifices. In whatever form, they function very effectively as direct dyeing hair dye preparations.

It is, accordingly, an object of the present invention to provide a clear, stable, aqueous hair dyeing composition having distributed therein a dye which is substantially insoluble in water; said dyeing composition being suitable for use in the direct dying of hair.

It is also an object of the present invention to provide a composition of the aforesaid character which avoids the disadvantages noted above found in similar prior art products.

It is still a further object of the present invention to provide a composition of the above character in aerosol form.

Other and more detailed objects of this invention will be apparent from the following description and claims.

As mentioned above, a feature of the present invention is that it employs dyes which, for all practical purposes, are insoluble in water. As used herein, a dye is considered to be insoluble in water if it has a solubility in water at ordinary temperature of no greater than 0.3 percent. The dyes useful herein are further characterized by their solubility in the oil phase (to be described in more detail below) which should be greater than their solubility in water. Furthermore, the dyes should be capable of direct dyeing of hair at ambient temperatures from an aqueous composition containing the particular oil phase selected. There are a number of dyes known to those skilled in this art which meet these criteria and are suitable for the present purposes. Among these mention may be made of the general class of Disperse dyes, Solvent dyes and some Acid Milling dyes. These may have a variety of chromophoric structures and include such dyes as Nitro Dyes, Nitroso Dyes, Azo Dyes, Naphthoquinone dyes, Anthraquinone Dyes, Quinoline Dyes, etc. By way of further illustration of the dyes that are useful in the present invention, the following are given:

Nitro Dyes
  C.I. 10938 (C.I. Disperse Yellow 42)
  C.I. 10350 (C.I. Disperse Orange 15)
  4-Nitro-1-naphthylamine
  2,4-Dinitro-1-naphthylamine
  C.I. 10375 (C.I. Disperse Yellow 9)
Nitroso Dyes
  1-Nitroso-2naphthol
Azo Dyes
  C.I. 11025 (C.I. Disperse Black 3)
  C.I. 11110 (C.I. Disperse Red 1)
  C.I. 11365 (C.I. Disperse Black 1)
  C.I. 26090 (C.I. Disperse Yellow 7)
  C.I. 12690 (C.I. Disperse Yellow 8)
Naphthoquinone Dyes
  C.I. 75490 (C.I. Natural Yellow 16)
  C.I. 75520 (C.I. Natural Red 20)
  C.I. 75500 (C.I. Natural Brown 7)
Anthraquinone Dyes
  C.I. 64500 (C.I. Disperse Blue 1)
  C.I. 60710 (C.I. Disperse Red 15)
  C.I. 61100 (C.I. Disperse Violet 1)
  C.I. 61500 (C.I. Disperse Blue 14)
  C.I. 66305 (C.I. Disperse Blue 26)
Quinoline Dyes
  C.I. 47000 (C.I. Solvent Yellow 33)

In addition to the above, other dyes of low water solubility may be employed in this invention. These include the Acid Milling Dyes which may be illustrated by the following:
  C.I. 13095 (C.I. Acid Yellow 63)
  C.I. 60730 (C.I. Acid Violet 43)
  C.I. 43525 (C.I. Acid Violet 15)
  C.I. 62105 (C.I. Acid Blue 78)
  C.I. 17065 (C.I. Acid Red 32)
  C.I. 50315 (C.I. Acid Blue 59)

The quantity of dye employed in the present composition may vary within the limits of solubility characteristics of these dyes. As a practical matter, they will ordinarily constitute between 0.01 percent and 6.0 percent by weight of the total composition and preferably between 0.2 percent and 4.5 percent by weight of said composition.

Another feature of the present invention is the provision of an oil phase in which the dyes are soluble or very intimately dispersible. The oil phase employed is one which is not soluble in water, but one that may be dispersible therein. This dispersibility may be a property which is inherent in the oil itself or one which is imparted to it by other agents such as surface active agents. The dye that is distributed in this oil phase is in the form of a true solution of the dye in the oil or one in which the distribution of the dye is so intimate as to approximate a true solution.

A number of oily materials are known in the art which are suitable for the present purposes. Of particular interest are oily long chain fatty derivatives of formula RX wherein:

a. R is a long-chain hydrocarbon moiety having from 8 to 20 carbon atoms; and b. X is selected from the group consisting of

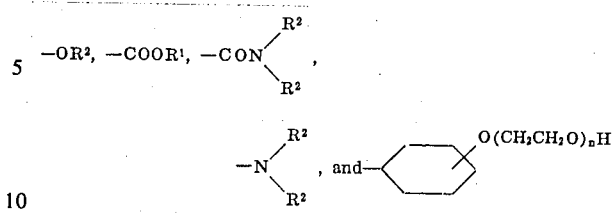

$R^1$ is an alkyl radical having 1 to 6 carbon atoms and $R^2$ is hydrogen or $-(CH_2CH_2O)_nH$, n having a value of from 1–6.

In one of the preferred forms of this invention the oil phase takes the form of fatty acid alkanol amides and particularly compounds of the formula:

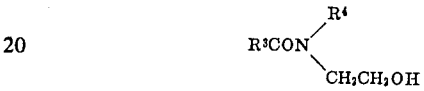

wherein $R^3$ is the hydrocarbon moiety of a long-chain fatty acid having from 10 to 20 carbon atoms and $R^4$ is hydrogen or hydroxyethyl e.g., lauric diethanolamide etc.

To specifically illustrate other oils that are useful in this invention, the following are given:

I. fatty alcohols such as oleyl, lauryl, myristyl, stearyl and lanolin alcohols (e.g., Super Hartolan);

II. fatty amines such as stearyl amine, lauryl amine;

III. fatty acid esters such as isopropyl palmitate, butyl stearate and isopropyl myristate;

IV. long-chain aliphatic amides such as stearamide, coco fatty acid amide and oleamide;

V. the "ethoxylated" (i.e., oxyethylated, by reaction with ethylene oxide) derivatives of long-chain aliphatic alcohols, amines, acids, amides and alkylphenols, provided that the number of moles of ethylene oxide incorporated is not so great as to impart water solubility; usually 1 to 6 moles of ethylene oxide is the desirable range; these include for example:

a. ethoxylated fatty alcohols such as the reaction products of oleyl alcohol with 5 moles of ethylene oxide (Volpo 5), lauryl alcohol monoethoxylated (Siponic L1), tallow alcohol with 6 moles of ethylene oxide (Siponic E3), and lanolin alcohols with 5 moles of ethylene oxide (Solulan 5);

b. ethoxylated long-chain amines such as coco-amine reaction product with 2 moles ethylene oxide (Ethomeen C12);

c. ethoxylated fatty acids such as diethyleneglycol monostearate, stearic acid esterified with 5 moles ethylene oxide (Ethofat 60/15), and coco-fatty acid esterified with 5 moles of ethylene oxide (Ethofat C/15);

d. ethoxylated fatty acid amides such as oleamide with 5 moles of ethylene oxide (Ethomid 0/15), hydrogenated tallow acid amide with 5 moles of ethylene oxide (Ethomid HT 15), linoleic monoethanolamide, lauric diethanolamide, and stearic diethanolamide;

e. ethoxylated alkylphenols such as p-nonyl-phenol with 3 moles of ethylene oxide (Igepal CO 430)

In addition to the above "ethoxylated" derivatives, there are also included other hydroxyalkyl (containing 1 to 6 hydroxy groups on the alkyl), or polyhydroxyalkyl derivatives of long-chain alcohols, amines, acids or amides, whose solubility in water is sufficiently low so as to give with water a separate oil phase; examples of these are glyceryl monooleate, sorbitan monolaurate (e.g., Armotan ML), and propyleneglycol monostearate.

The quantity of oil phase contained in the present composition may vary widely depending on the ultimate form of the composition, the quantity of dye employed, the quantity of the aqueous medium utilized, etc. Generally, however, it will constitute between about 0.5 percent to 6 percent by weight of the total composition and preferably from 1 percent to 3 percent by weight.

The general characteristics of the "coupling agent" utilized in the present invention have been described above. More particularly, these materials may be defined as being selected from the class consisting of water-soluble alkylene glycol or alkylene glycol ether alcohols, long-chain fatty acid soaps, long-chain fatty acid compound polyoxyalkyl or polyhydroxyalkyl derivatives and mixtures thereof. Each type of component contributes to the composition its beneficial characteristics as measured by the increased dyeing efficiency of the resulting composition as compared with prior art compositions of this character. However, by far the optimum results are obtained when the "coupling agent" comprises a mixture of all three types of materials.

To illustrate further the types of materials that may be used as "coupling agents" in the present invention, mention may be made of the following:

A. Alkylene glycol or alkylene glycol ether alcohols: These may be described by the general formula:

$$R^5O(R^6O)_nR^7OH$$

wherein $R^5$ is H or alkyl having 1 to 4 carbon atoms and $R^6$ and $R^7$ are divalent alkylene radicals having 2 to 4 carbon atoms and $n$ is a number from 0 to 150. Illustrative of the compounds are: ethylene glycol, propylene glycol, diethylene glycol, dipropylene glycol, polyethylene glycols of molecular weight 190–7500 (Carbowaxes), methoxyethanol, ethoxyethanol (Cellosolve), n-butoxyethanol, diethylene glycol monomethyl ether (Methyl Carbitol), diethylene glycol monoethyl ether (Ethyl Carbitol), diethylene glycol monobutyl ether (Butyl Carbitol), polyethylene glycols methyl ethers of molecular weight 335–785 (Carbowaxes).

B. Long-chain fatty acid soaps; e.g., $(R^8COO)_aM$ wherein $R^8$ is the hydrocarbon moiety of a long-chain fatty acid having 10 to 20 carbon atoms. M is a monovalent or polyvalent salt-forming group and "a" is the valence of group M. This encompasses the sodium, potassium, ammonium and substituted ammonium salts derived from low molecular weight water soluble amines such as methylamine, trimethylamine, diethylamine, monoethanolamine, diethanolamine, triethanolamine, isopropanolamine, ethylenediamine, trimethylenediamine, 2-hydroxyethylamino-ethylamine, iminodipropylamine, 2-dimethylaminoethylamine, trishydroxymethylmethylamine, morpholine, N-methylpiperidine, N-methylpiperazine and the like; with long-chain fatty acids such as n-capric, n-lauric, n-myristic, n-palmitic, n-stearic, cerotic, oleic, linoleic, linolenic, recinoleic, uricic, tallow fatty acids, coco fatty acids.

C. Water-soluble long-chain fatty compound polyoxyalkyl or polyhydroxyalkyl derivatives e.g., polyoxyalkyl derivatives of long chain aliphatic alcohols, amines, acids, amides and alkyl phenols and polyhydroxyalkyl esters of long-chain fatty acid. The polyoxyalkyl derivatives include those aforementioned aliphatic compounds which have been "ethoxylated" (i.e., reacted with ethylene oxide) to a degree which imparts significant water solubility to the derivatives, such derivatives being used in the formulations of the invention in an amount no greater than is soluble in water. Usually the number of moles of ethylene oxide incorporated in the structure of the derivatives is greater than five, and most commonly ranges from 8 to 300.

As examples of such "ethoxylated" compounds there may be mentioned the following in which E.O. stands for ethylene oxide:

a. ethoxylated fatty alcohols such as oleyl alcohol with 10 moles E.O. (Volpo 10), lanolin alcohols with 40 moles E.O. (Polychol 40), lauryl alcohol with 25 moles E.O. (Siponic L 25), tallow alcohols with 30 moles E.O. (Siponic E 15), lanolin alcohols with 75 moles E.O. (Solulan 75);

b. ethoxylated long-chain amines such as soya amine with 10 moles E.O. (Ethomeen S/20);

c. ethoxylated fatty acids such as oleic acid with 10 moles E.O. (Ethofat 0/20), and rosin fatty acids with 15 moles E.O. (Ethofat 242/25);

d. ethoxylated fatty acid amides such as lauric acid amide with 20 moles E.O., stearic acid amide with 100 moles E.O. and hydrogenated tallow amide with 50 moles E.O. (Ethomid HT/60);

e. ethoxylated polyhydroxyalkyl long-chain esters such as glyceryl monostearate with 20 moles E.O. (Aldosperse MS-20), sorbitan monolaurate with 20 moles E.O. (Glycosperse L-20), and castor oil with 200 moles E.O. (Pegosperse CO-200);

f. ethoxylated long-chain alkylphenols such as nonylphenol with 15 moles E.O. (Igepal CO-730) and octylphenol with 40 moles E.O. (Igepal CA-897).

Besides such "ethoxylated" compounds, it is possible to include also poly-condensed products with propylene oxide.

Of special interest as "coupling agents" are the fatty acid polyoxyalkyl amides of formula:

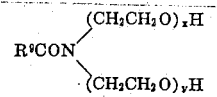

wherein $x$ and $y$ are numbers from 0 to 300 and the sum of $x$ and $y$ is 8–300. $R^9$ is the hydrocarbon moiety of a long-chain fatty acid having from 10 to 20 carbon atoms.

The total quantity of "coupling agent" employed in the present composition may also vary widely depending on the nature and quantity of the other ingredients. Usually, however, this will constitute between 3 and 18 percent by weight based on the total weight of the composition. When the "coupling agent" consists of a mixture of a alkylene glycol or alkylene glycol ether alcohol; long chain fatty acid soap; and long-chain fatty compound polyoxyalkyl or polyhydroxyalkyl derivatives these components will ordinarily be present in the following proportions:

| | % by weight of total coupling agent | |
|---|---|---|
| | general range | preferred range |
| Alkylene glycol or alkylene glycol ether alcohol | 1.0% to 15% | 2 to 5 |
| Long-chain fatty acid soap | 0.5 % to 6 % | 1.0 to 3.0 |
| Long-chain fatty compound polyoxyalkyl or polyhydroxyalkyl derivatives | 0.5% to 6% | 1.0 to 3.0 |

In addition to the components mentioned above, the present invention may also contain other ingredients which may assist in the dyeing operation or enhance the stability or cosmetic appearance of the composition. Among these mention may be made of thickening agents which aid in the application of the dye to the hair. Thickening agents suitable for hair dyeing compositions are well known in this art. By way of illustration, mention may be made of hydroxyethyl cellulose *DS 0.9 to 1.0 viscosity 53–103 CPS at 25°C), sodium carboxymethyl cellulose (DS 0.65 to 0.85 viscosity 2 percent aq. sol. 500 CPS at 25°C); commercial methylcellulose (methoxy content 27–31.5 percent and viscosity 2 percent aq. sol. at 25°C of 4,000 CPS); hydroxybutyl cellulose (Methocel HB), sodium alginate, fumed silica, colloidal magnesium aluminum silicate. The thickening agent, when employed will ordinarily constitute between 0.01 percent to 4 percent by weight of the total composition.

In addition to thickening agents, other ingredients such as perfumes, antioxidants, hair setting agents, alkalizing agents, conditioning and grooming agents may also be incorporated in the composition of this invention.

As previously mentioned, the compositions of the present invention are well suited for incorporation in an aerosol system. In this aspect of the invention a concentrate is first prepared containing the ingredients described above. This concentrate is then charged into an aerosol can and the propellant in the desired proportion is introduced into the can under pressure. Generalized concentrate formulations that are encompassed in the present invention are given in Table II below.

TABLE II

| Ingredient | % by weight based on total weight of concentrate |
|---|---|
| Dye | .01 to 6.0 |
| Oil | 0.5 to 6 |
| "Coupling Agent" | 3 to 18 |
| Thickening Agent | 0 to 4 |
| Antioxidant | 0 to 1 |

In formulating the aerosol preparation of this invention the relative proportions of concentrate to propellant may be varied considerably. In general, however, the concentrate will constitute between 88 percent to 96 percent by weight of the composition; the remainder being made up of propellant.

As used herein, the term propellant means propellant system which may comprise a single propellant component or a combination of propellant components. It is well known in the aerosol art that it is often advantageous to use a mixture of fluorocarbon propellants or the combination of a hydrocarbon propellant and a fluorocarbon propellant to obtain the special benefits which the single component propellants do not exhibit.

In preparing aerosol compositions encompassed in the present invention any of a variety of propellants may be used e.g., gases or low boiling liquids. It may be a fluorinated or a fluorochlorinated lower saturated aliphatic hydrocarbon, and preferably a halogenated alkane containing not more than 2 carbon atoms and at least 1 fluorine atom, or mixture thereof. The preferred halogenated lower alkane compounds may be represented, generally, by the formula $C_mH_nCl_yF_z$, wherein $m$ is an integer less than 3, $n$ is an integer or zero, $y$ is an integer or zero, and $z$ is an integer, such that $n + y + z = 2_m + 2$.

It may also be a liquefied hydrocarbon gas, e.g., butane, isobutane, propane, etc. These may be used alone or admixed with each other. In addition, they may also be employed in admixture with the halogenated propellants mentioned above.

The propellants should preferably possess a boiling point of less than 75°F at 760 mm. pressure. Typical examples of useful propellants are dichlorodifluoromethane ("Freon 12"), dichlorotetrafluoroethane ("Freon 114"), $CClF_2$—$CClF_2$, trichloromonofluoromethane ("Freon 11"), dichloromonofluoromethane ("Freon 21"), monochlorotrifluoromethane ("Freon 13"), $CCl_2$—$CClF_2$ ("Freon 113") or 1,1 difluoroethane ("Freon 152A").

It is a feature of the present invention to provide the semi-permanent hair dye preparation described above in the form of an aerosol composition which is dispensed from an aerosol can in the form of a relatively stable foam. This makes available a very convenient method by which the semi-permanent hair dye may be applied to the head. In use the aerosol foam may be applied directly to the hair and worked through or may be dispensed onto one's hand and then transferred from the hand to the hair. The foam is allowed to remain on the hair for fifteen to thirty minutes and then rinsed off with water.

In preparing the compositions of this invention the procedural steps employed are quite conventional and involve merely mixing the ingredients together to obtain a homogeneous dispersion. Ordinarily, the dye will first be formed into a slurry and then incorporated into the oil phase. This will be followed by the incorporation of the other ingredients. Stirring and temperature can be adjusted to insure the preparation of a homogeneous dispersion of the oil phase in the aqueous phase.

The following Examples are further illustrative of the present invention. It is to be understood, however, that the invention is not limited thereto. Unless otherwise specified, percentages are given in per cent by weight.

"Tallow fatty acids" as used herein is a commercial mixture of fatty acids attained by the hydrolysis of the oleo stock of beef tallow. This contains principally the following fatty acids in the proportions indicated: oleic acid (37–43 percent); palmitic (24–32 percent); stearic (20–25 percent); myristic (3–6 percent); linoleic (2–3 percent). See Merck Index Eighth Edition, page 1011, 1968.

Ethomid HT-60 as used herein is a commercial product prepared by the ethoxylation of tallow fatty acid amides with 50 moles of ethylene oxide. The mixture of fatty acid amides corresponds to the fatty acid content given above for tallow fatty acids. This may further be described as a mixture of amides that correspond to formula:

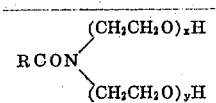

in which R is (37–43 percent) oleyl, (24–32 percent) palmityl, (20–25 percent) stearyl, (3–6 percent) myristyl and (2–3 percent) linoleyl; and the sum of $x + y$ is equal to about 50.

Hydroxyethylcellulose as used herein refers to the Union Carbide CELLOSIZE hydroxyethylcellulose (HEC WP 40) having an average degree of substitution (D.S.) of from 0.9 to 1.0 and a viscosity of 53–102 CPS at 25°C, the degree of substitution designating the average number of hydroxyl positions on the anhydroglucose unit which has reacted with ethylene oxide and the viscosity being a measure of the molecular weight of the polymer.

Methylcellulose as used herein refers to the methyl ether of cellulan having an average methoxyl content of about 27–31.5 and a viscosity (2 percent aqueous solution at 25°C) of 4,000 CPS.

Tall oil fatty acids as used herein refers to the commercial product "Acintol EPG" and is a mixture of fatty acids having the following average composition: palmitic acid (0.5 percent), palmitoleic acid (0.5 percent), stearic acid (2.5 percent), oleic acid (52.5 percent), linoleic acid (37.0 percent), linoleic acid conjugated (as determined by U.V. and containing higher molecular weight polyunsaturated fatty acids) (6 percent), other miscellaneous acids and unknowns 1 percent.

E.O. as used herein refers to the number of moles of ethylene oxide incorporated in the particular polyethoxylated compound.

EXAMPLE 1

The following ingredients were mixed to give an oil-in-water emulsion in which the dye is contained in the oil phase:

| | |
|---|---|
| 2-(2-Ethoxyethoxy) ethanol (CARBITOL) | 4% |
| Tall oil fatty acids | 2% |
| Lauric diethanolamide | 1.5% |
| Monoethanolamine | 0.8% |
| Hydroxyethylcellulose | 1.2% |
| 1,4,5,8 tetraaminoanthraquinone | 0.20% |
| Water | q.s. 100% |

A slurry was formed by mixing Carbitol with the dye. To this was added lauric diethanolamide and these materials were stirred to form a homogenous mixture. To this was added the tall oil fatty acids and the monoethanolamine. The batch was then brought to about 50 percent with water and the hydroxyethylcellulose was added and the mixture was stirred an additional hour. After this, the water was added to bring the composition up to 100 percent.

Following the procedure similar to Example 1, the following compositions were prepared:

TABLE III

| Ingredients | % by weight of total composition | | | | | |
|---|---|---|---|---|---|---|
| | Ex.2 | Ex.3 | Ex.4 | Ex.5 | Ex.6 | Ex.7 |
| CARBITOL | — | 4 | 4 | — | 4 | — |
| Tall Oil Fatty Acids | 2 | — | 2 | — | — | 2 |
| Lauric diethanolamide | 1.5 | 1.5 | 1.5 | 1.5 | 1.5 | 1.5 |
| ETHOMID HT-60 | 1.5 | 1.5 | 1.5 | 1.5 | — | — |
| Monoethanolamine | 0.8 | 0.8 | 0.8 | 0.8 | 0.8 | 0.8 |
| Hydroxyethylcellulose | 1.2 | 1.2 | 1.2 | 1.2 | 1.2 | 1.2 |
| 1,4,5,8 tetraaminoanthraquinone | .20 | .20 | .20 | .20 | .20 | .20 |
| Water | QS 100 | QS 100 | QS 100 | QS 100 | QS 100 | QS 100 |

EXAMPLE 8

A composition is prepared in accordance with Example 4 excepting that (1) the hydroxyethylcellulose is replaced with gum acacia, (2) tall oil fatty acids are replaced with oleic acid, and (3) the ETHOMID HT-60 is replaced with the reaction product of oleyl amide and 50 moles of ethylene oxide.

EXAMPLE 9

A composition is prepared in accordance with Example 4 excepting that the tall oil fatty acids are replaced with oleic acid and the ETHOMID HT-60 and hydroxyethylcellulose are removed.

EXAMPLE 10

Aerosol Composition

Eighty-four (84) parts by weight of the composition of Example 4 was introduced into an aerosol can. The aerosol valve was applied to the can and then 16 parts by weight of a propellant containing 65 percent Freon 114 and 35 percent Freon 152A (1,1 difluoroethane) was charged through the valve into the can under pressure.

| | EXAMPLES | | | | | |
|---|---|---|---|---|---|---|
| | 11 | 12 | 13 | 14 | 15 | 16 |
| 1,4,5,8 tetraaminoanthraquinone | 0.2 | 0.2 | 0.2 | 0.2 | 0.2 | — |
| 1,4-diaminoanthraquinone | — | 0.2 | 0.2 | 0.2 | 0.2 | 0.2 |
| C.I. Disperse Red 15 (C.I. 60710) | — | — | 0.2 | 0.2 | 0.2 | — |
| C.I. Disperse Yellow 8 (C.I. 12690) | — | — | — | 0.2 | 0.2 | — |
| C.I. Acid Red 32 (C.I. 17065) | — | — | — | — | 0.2 | — |
| 2(2-Ethoxyethoxy) ethanol | 4.0 | 4.0 | 5.0 | 5.0 | — | — |
| 2-Ethoxyethanol | — | — | — | — | 5.0 | 5.0 |
| Oleic acid amide | — | — | 1.5 | — | — | — |
| Lauric diethanolamide | 3.0 | 1.5 | 1.5 | 1.5 | 1.5 | 0.5 |
| Linoleic monoethanolamide | — | 1.5 | — | — | — | 0.5 |
| Ethoxylated (5 E.O.) oleyl alcohol (Volpo 5) | — | — | — | 1.5 | 1.5 | 0.5 |

-Continued

EXAMPLES

| | 11 | 12 | 13 | 14 | 15 | 16 |
|---|---|---|---|---|---|---|
| Ethoxylated (50 E.O.) hydrogenated tallow amide (Ethomid HT/60) | 3.0 | 1.5 | 1.5 | 1.5 | 1.5 | 0.5 |
| Ethoxylated (75 E.O.) lanolin alcohols (Solulan 75) | — | 1.5 | — | — | — | 0.5 |
| Ethoxylated (200 E.O.) castor oil (Pegosperse CO-200) | — | — | 1.5 | — | — | 0.5 |
| Ethoxylated (10 E.O.) soya amine (Ethomeen S-20) | — | — | — | 1.5 | — | — |
| Ethoxylated (15 E.O.) rosin fatty acids (Ethofat 242/25) | — | — | — | — | 1.5 | 0.5 |
| Oleic acid | — | 2.0 | — | 2.0 | — | 2.0 |
| Tallow fatty acid | 2.0 | — | 2.0 | — | 2.0 | — |
| Palmitic acid | — | — | — | — | — | — |
| Ammonia | — | — | — | — | — | — |
| Monoethanolamine | 0.8 | 0.8 | — | — | — | — |
| Diethanolamine | — | — | 0.9 | 0.9 | — | — |
| Triethanolamine | — | — | — | — | 1.0 | 1.0 |
| Hydroxyethylcellulose | 2.4 | 2.4 | 2.4 | — | — | — |
| Methylcellulose | — | — | — | 2.4 | 2.4 | — |
| Fumed silica (Cab-O-Sil) | — | — | — | — | — | 2.4 |
| Water | q.s. to 100% | | | | | |

| | 17 | 18 | 19 | 20 | 21 | 22 |
|---|---|---|---|---|---|---|
| 1,4,5,8 tetraaminoanthraquinone | — | — | 0.2 | 0.2 | 0.2 | — |
| 1,4-diaminoanthraquinone | — | — | — | — | 0.2 | 0.2 |
| C.I. Disperse Red 15 (C.I. 60710) | 0.2 | — | 0.2 | — | 0.2 | 0.2 |
| C.I. Disperse Yellow 8 (C.I. 12690) | — | 0.2 | — | 0.2 | — | — |
| C.I. Acid Red 32 (C.I. 17065) | — | — | — | — | — | — |
| 2(2-Ethoxyethoxy)ethanol | — | — | — | 5.0 | 5.0 | 4.0 |
| 2-Ethoxyethanol | 5.0 | 4.0 | 5.0 | — | — | — |
| Oleic acid amide | 0.5 | — | — | — | 2.5 | 2.5 |
| Lauric diethanolamide | — | 2.5 | 2.5 | 2.5 | — | — |
| Linoleic monoethanolamide | 1.5 | — | — | — | — | — |
| Ethoxylated (5 E.O.) oleyl alcohol (Volpo 5) | 0.5 | — | — | — | — | — |
| Ethoxylated (50 E.O.) hydrogenated tallow amide (Ethomid HT/60) | — | — | — | — | 2.5 | — |
| Ethoxylated (75 E.O.) lanolin alcohols (Solulan 75) | 2.5 | — | — | — | — | 2.5 |
| Ethoxylated (200 E.O.) castor oil (Pegosperse CO-200) | — | 2.5 | — | — | — | — |
| Ethoxylated (10 E.O.) soya amine (Ethomeen S-20) | — | — | 2.5 | — | — | — |
| Ethoxylated (15 E.O.) rosin fatty acids (Ethofat 242/25) | — | — | — | 2.5 | — | — |

-Continued

EXAMPLES

| | 17 | 18 | 19 | 20 | 21 | 22 |
|---|---|---|---|---|---|---|
| Oleic acid | — | — | — | — | — | 2.0 |
| Tallow fatty acid | — | 2.0 | — | 2.0 | 2.0 | — |
| Palmitic acid | 2.0 | — | 2.0 | — | — | — |
| Ammonia | — | — | — | — | — | — |
| Monoethanolamine | — | — | 0.8 | — | — | — |
| Diethanolamine | — | 0.9 | — | 0.9 | — | — |
| Triethanolamine | 1.0 | — | — | — | 1.0 | 1.0 |
| Hydroxyethylcellulose | — | — | 2.4 | 2.4 | 2.4 | — |
| Methylcellulose | — | — | — | — | — | 2.4 |
| Fumed silica (Cab-O-Sil) | 2.4 | 2.4 | — | — | — | — |
| Water | q.s. to 100% | | | | | |

| | 23 | 24 | 25 | 26 | 27 | 28 |
|---|---|---|---|---|---|---|
| 1,4,5,8 tetraaminoanthraquinone | — | — | — | — | — | — |
| 1,4-diaminoanthraquinone | 0.2 | 0.2 | — | — | — | — |
| C.I. Disperse Red 15 (C.I. 60710) | — | 0.2 | 0.2 | 0.2 | 0.2 | — |
| C.I. Disperse Yellow 8 (C.I. 12690) | 0.2 | 0.2 | 0.2 | — | 0.2 | 0.2 |
| C.I. Acid Red 32 (C.I. 17065) | — | — | — | — | 0.2 | 0.2 |
| 2(2-Ethoxyethoxy)ethanol | 5.0 | — | — | 5.0 | 4.0 | — |
| 2-Ethoxyethanol | — | 4.0 | 5.0 | — | — | 5.0 |
| Oleic acid amide | 2.5 | 2.5 | 2.5 | — | — | — |
| Lauric diethanolamide | — | — | — | — | — | — |
| Linoleic monoethanolamide | — | — | — | 2.5 | 2.5 | 2.5 |
| Ethoxylated (5 E.O.) oleyl alcohol (Volpo 5) | — | — | — | — | — | — |
| Ethoxylated (50 E.O.) hydrogenated tallow amide (Ethomid HT/60) | — | — | 3.0 | — | — | — |
| Ethoxylated (75 E.O.) lanolin alcohols (Solulan 75) | — | — | — | — | 3.0 | — |
| Ethoxylated (200 E.O.) castor oil (Pegosperse CO-200) | 2.5 | — | — | — | — | 3.0 |
| Ethoxylated (10 E.O.) soya amine (Ethomeen S-20) | — | 2.5 | — | — | — | — |
| Ethoxylated (15 E.O.) rosin fatty acids (Ethofat 242/25) | — | — | 2.5 | — | — | — |
| Oleic acid | — | — | — | 2.0 | — | — |
| Tallow fatty acid | — | — | — | — | 2.0 | 2.0 |
| Palmitic acid | 2.0 | 2.0 | 2.0 | — | — | — |
| Ammonia | — | — | 0.5 | 0.5 | 0.5 | — |
| Monoethanolamine | — | 0.8 | — | — | — | 0.8 |
| Diethanolamine | 0.9 | — | — | — | — | — |
| Triethanolamine | — | — | — | — | — | — |
| Hydroxyethylcellulose | 2.4 | — | — | 2.4 | — | — |
| Methylcellulose | — | — | — | — | 2.4 | 2.4 |
| Fumed silica (Cab-O-Sil) | — | 2.4 | 2.4 | — | — | — |
| Water | q.s. to 100% | | | | | |

EXAMPLES

| | 29 | 30 |
|---|---|---|
| 1,4,5,8 tetraaminoanthraquinone | — | — |
| 1,4-diaminoanthraquinone | — | — |
| C.I. Disperse Red 15 (C.I. 60710) | 0.2 | — |
| C.I. Disperse Yellow 8 (C.I. 12690) | — | — |
| C.I. Acid Red 32 (C.I. 17065) | 0.2 | 0.2 |
| 2(2-Ethoxyethoxy)ethanol | — | 5.0 |
| 2-Ethoxyethanol | 5.0 | — |
| Oleic acid amide | — | — |

-Continued

| | EXAMPLES | |
|---|---|---|
| | 29 | 30 |
| Lauric diethanolamide | — | — |
| Linoleic monoethanolamide | 2.5 | 2.5 |
| Ethoxylated (5 E.O.) oleyl alcohol (Volpo 5) | — | — |
| Ethoxylated (50 E.O.) hydrogenated tallow amide (Ethomid HT/60) | — | — |
| Ethoxylated (75 E.O.) lanolin alcohols (Solulan 75) | — | — |
| Ethoxylated (200 E.O.) castor oil (Pegosperse CO-200) | — | — |
| Ethoxylated (10 E.O.) soya amine (Ethomeen S-20) | 3.0 | — |
| Ethoxylated (15 E.O.) rosin fatty acids (Ethofat 242/25) | — | 3.0 |
| Oleic acid | — | — |
| Tallow fatty acid | 2.0 | 2.0 |
| Palmitic acid | — | — |
| Ammonia | — | — |
| Monoethanolamine | 0.8 | 0.8 |
| Diethanolamine | — | — |
| Triethanolamine | — | — |
| Hydroxyethylcellulose | 2.4 | — |
| Methylcellulose | — | — |
| Fumed silica (Cab-O-Sil) | — | 2.4 |
| Water | q.s. to 100% → | |

What is claimed is:

1. A hair dye composition comprising a stable oil-in-water emulsion in which the discontinuous oil phase is intimately distributed in the aqueous phase; said oil phase comprising about 1 to 4 percent by weight of a water-insoluble oil having dissolved therein or finely dispersed therein about 0.01 to 6 percent by weight of a water-insoluble direct dyeing hair dye; said composition containing about 3 to 18 percent by weight of a coupling agent which is partly soluble both in said oil phase and said aqueous phase whereby stability is imparted to said emulsion; said coupling agent being selected as to type and concentration so as to maintain the solubility of said dye in the aqueous phase below the level at which the dye would have greater affinity for the aqueous phase than the hair during a dyeing operation; said oil phase comprising an oily long-chain fatty derivative selected from the group consisting of compounds of the formula RX in which:

a. R is a long-chain hydrocarbon moiety having 8 to 20 carbon atoms; and
b. X is selected from the group consisting of

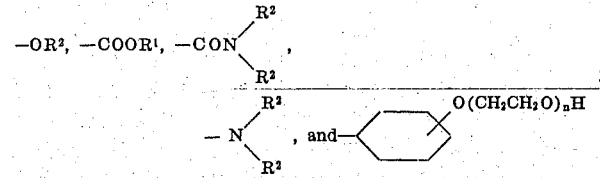

$R^1$ is an alkyl radical having 1 to 6 carbom atoms and $R^2$ is hydrogen or —$(CH_2CH_2O)_nH$, n having a value of from 1 to 6, glyceryl monooleate, sorbitan monolaurate, and propylene glycol monostearate; and wherein said coupling agent is a water-soluble compound selected from the group consisting of:

a. an alkylene glycol or an alkylene glycol ether alcohol of the formula:

$$R^5O(R^6O)_nR^7OH$$

wherein $R^5$ is H or alkyl having 1 to 4 carbon atoms and $R^6$ and $R^7$ are divalent alkylene radicals having 2 to 4 carbon atoms and n is a number from 0 to 150;

b. a long-chain fatty acid soap of the formula:

$$(R^8COO)_aM$$

wherein $R^8$ is the hydrocarbon moiety of a long-chain fatty acid having 10 to 20 carbon atoms, M is a monovalent or polyvalent salt-forming group and "a" is the valence of group M;

c. a long-chain polyoxyalkylated compound selected from the group consisting of a polyoxyalkylated long-chain fatty alcohol, a polyoxyalkylated polyhydroxyalkyl ester of a long-chain fatty acid; a polyoxyalkylated long-chain amine; a polyoxyalkylated long-chain fatty acid; a polyoxyalkylated long-chain fatty acid amide and a polyoxyalkylated long-chain alkyl phenol containing about 8 to 300 oxyalkyl groups in the structure; and d. mixtures of said coupling agents.

2. A composition according to claim 1 wherein said water-insoluble oil is a fatty acid alkanol amide of the formula:

wherein $R^3$ is the hydrocarbon moiety of a long-chain fatty acid containing from about 10 to 20 carbon atoms and $R^4$ is hydrogen or hydroxyethyl.

3. A composition according to claim 1 wherein said water soluble coupling agent is a polyoxyalkylated long-chain fatty acid amide of the formula:

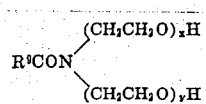

in which $R^9$ is the hydrocarbon moiety of a long-chain fatty acid having from 10 to about 20 carbon atoms and x and y being numbers from about 0 to 300; the sum of $x + y$ being about 8 to 300.

4. A composition according to claim 1 wherein said dye has a solubility in water at ambient temperatures of no more than about 0.3 percent.

5. A composition according to claim 1 wherein said coupling agent comprises a mixture of said alkylene glycol or alkylene glycol ether alcohol, said long-chain fatty acid soap and said long-chain polyoxyalkylated compound.

6. A composition according to claim 5 wherein the coupling agent comprises a. 1 to 15 percent by weight based on the total weight of the composition of said alkylene glycol or alkylene glycol ether alcohol;
b. 0.5 percent to 6 percent by weight based on the total weight of the composition of said long-chain fatty acid soap; and
c. 0.5 to 6 percent by weight based on the total weight of the composition of said long-chain polyoxyalkylated compound.

7. A hair dye composition comprising a stable oil-in-water emulsion in which the discontinuous oil phase is intimately distributed in the aqueous phase; said oil phase comprising about 1 to 4 percent by weight of a water-insoluble oil having dissolved therein or finely dispersed therein about 0.01 to 6 percent by weight of a water-insoluble direct dyeing hair dye; said composition containing about 3 to 18 percent by weight of a coupling agent which is partly soluble both in said oil phase and said aqueous phase whereby stability is imparted to said emulsion; said coupling agent being selected as to type and concentration so as to maintain the solubility of the dye in the aqueous phase below the level at which the dye would have greater affinity for the aqueous phase than the hair during a dyeing operation; and wherein said water-insoluble oil is:

a. a fatty acid alkanol amide of the formula:

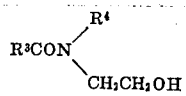

in which $R^3$ is the hydrocarbon moiety of a long-chain fatty acid containing about 10 to 20 carbon atoms and $R^4$ is hydrogen or hydroxyethyl; and wherein b. the coupling agent is a water-soluble fatty acid polyoxyalkylated amide of the formula:

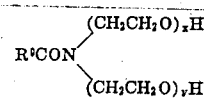

in which $R^9$ is the hydrocarbon moiety of a long-chain fatty acid having from 10 to 20 carbon atoms and $x$ and $y$ are numbers from about 0 to 300, the sum of $x + y$ being about 8 to 300.

8. A hair dye composition comprising a stable oil-in-water emulsion in which the discontinuous oil phase is intimately distributed in the aqueous phase; said oil phase comprising about 1 to 4 percent by weight of a water-insoluble oil having dissolved therein or finely dispersed therein about 0.01 to 6 percent by weight of a water-insoluble direction dyeing hair dye; said composition containing about 3 to 18 percent by weight of a coupling agent which is partly soluble both in said oil phase and said aqueous phase whereby stability is imparted to said emulsion; said coupling agent being selected as to type and concentration so as to maintain the solubility of the dye in the aqueous phase below the level at which the dye would have greater affinity for the aqueous phase than the hair during a dyeing operation; and wherein said water-insoluble oil is a fatty acid alkanol amide of the formula:

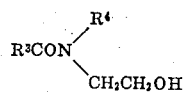

wherein $R^3$ is the hydrocarbon moiety of a long-chain fatty acid containing from about 10 to 20 carbon atoms and $R^4$ is hydrogen or hydroxyethyl; and wherein the coupling agent is a water-soluble alkylene glycol or alkylene glycol ether alcohol of the formula:

$$R^5O(R^6O)_nR^7OH$$

wherein $R^5$ is H or alkyl having 1 to 4 carbon atoms and $R^6$ and $R^7$ are divalent alkylene radicals having 2 to 4 carbon atoms and n is a number from 0 to 150.

9. A hair dye composition comprising a stable oil-in-water emulsion in which the discontinuous oil phase is intimately distributed in the aqueous phase; said oil phase comprising about 1 to 4 percent by weight of a water-insoluble oil having dissolved therein or finely dispersed therein about 0.01 to 6 percent by weight of a water-insoluble direct dyeing hair dye; said composition containing about 3 to 18 percent by weight of a coupling agent which is partly soluble both in said oil phase and said aqueous phase whereby stability is imparted to said emulsion; said coupling agent being selected as to type and concentration so as to maintain the solubility of the dye in the aqueous phase below the level at which the dye would have greater affinity for the aqueous phase than the hair during a dyeing operation; and wherein said water-insoluble oil is a fatty acid alkanol amide of the formula:

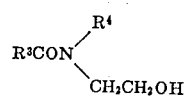

wherein $R^3$ is the hydrocarbon moiety of a long-chain fatty acid containing from about 10 to 20 carbon atoms and $R^4$ is hydrogen or hydroxyethyl; and wherein the coupling agent is a long-chain fatty acid soap of the formula:

$$(R^8COO)_aM$$

wherein $R^8$ is the hydrocarbon moiety of a long-chain fatty acid having 10 to 20 carbon atoms, M is a monovalent or polyvalent salt-forming group and "a" is the valence of group M.

10. A hair dye composition comprising a stable oil-in-water emulsion in which the discontinuous oil phase is intimately distributed in the aqueous phase; said oil phase comprising about 1 to 4 percent by weight of a water-insoluble oil having dissolved therein or finely dispersed therein about 0.01 to 6 percent by weight of a water-insoluble direct dyeing hair dye; said composition containing about 3 to 18 percent by weight of a coupling agent which is partly soluble both in said oil phase and said aqueous phase whereby stability is imparted to said emulsion; said coupling agent being selected as to type and concentration so as to maintain the solubility of the dye in the aqueous phase below the level at which the dye would have greater affinity for the aqueous phase than the hair during a dyeing operation; and wherein said water-insoluble oil is:

a. a fatty acid alkanol amide of the formula:

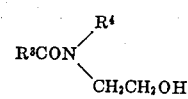

in which $R^3$ is the hydrocarbon moiety of a long-chain fatty acid containing about 10 to 20 carbon atoms and $R^4$ is hydrogen or hydroxyethyl; and wherein b. the coupling agent is a water-soluble compound selected from the group consisting of a polyoxyalkylated long-chain fatty alcohol, a polyoxyalkylated polyhydroxyalkyl ester of a long-chain fatty acid, a polyoxyalkylated long-chain amine; a polyoxyalkylated long-chain fatty acid; a polyoxyalkylated long-chain fatty acid amide, and a polyoxyalkylated long-chain alkyl phenol containing about 8 to 300 oxyalkyl groups in the structure.

11. An aerosol composition in an aerosol container comprising a concentrate and a propellant, said propellant being present in sufficient quantity and under sufficient pressure so as to propel said concentrate out of said container as a foam when the aerosol container is actuated, said concentrate being a hair dye composition comprising a stable oil-in-water emulsion in which the discontinuous oil phase is intimately distributed in the aqueous phase; said oil phase comprising about 1 to 4 percent by weight of a water-insoluble oil having dissolved therein or finely dispersed therein about .01 to 6 percent by weight of a water-insoluble direct dyeing hair dye; said composition containing about 3 to 18 percent by weight of a coupling agent which is partly soluble both in said oil phase and said aqueous phase whereby stability is imparted to said emulsion; said coupling agent being selected as to type and concentration so as to maintain the solubility of said dye in the aqueous phase below the level at which the dye would have greater affinity for the aqueous phase than the hair during a dyeing operation; said oil phase comprising an oily long-chain fatty derivative selected from the group consisting of compounds of the formula RX in which:

a. R is a long-chain hydrocarbon moiety having 8 to 20 carbon atoms; and
b. X is selected from the group consisting of

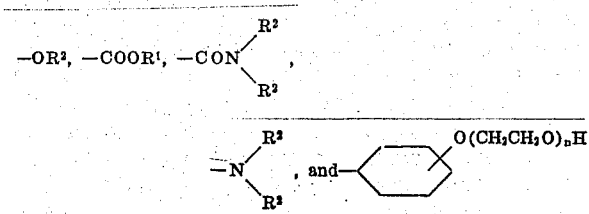

$R^1$ is an alkyl radical having 1 to 6 carbon atoms and $R^2$ is hydrogen or $-(CH_2CH_2O)_nH$, n having a value of from 1 to 6, glyceryl monooleate, sorbitan monolaurate, and propylene glycol monostearate; and wherein said coupling agent is a water-soluble compound selected from the group consisting of:

a. an alkylene glycol or an alkylene glycol ether alcohol of the formula:

$$R^5O(R^6O)_nR^7OH$$

wherein $R^5$ is H or alkyl having 1 to 4 carbon atoms and $R^6$ and $R^7$ are divalent alkylene radicals having 2 to 4 carbon atoms and n is a number from 0 to 150;

b. a long-chain fatty acid soap of the formula:

$$(R^8COO)_aM$$

wherein $R^8$ is the hydrocarbon moiety of a long-chain fatty acid having 10 to 20 carbon atoms, M is a monovalent or polyvalent salt-forming group and "a" is the valence of group M;

c. a long-chain polyoxyalkylated compound selected from the group consisting of a polyoxyalkylated long-chain fatty alcohol, a polyoxyalkylated polyhydroxyalkyl ester of a long-chain fatty acid; a polyoxyalkylated long-chain amine; a polyoxyalkylated long-chain fatty acid; a polyoxyalkylated long-chain fatty acid amide and a polyoxyalkylated long-chain alkyl phenol containing about 8 to 300 oxyalkyl groups in the structure; and d. mixtures of said coupling agents.

12. The aerosol composition according to claim 11 in which said concentrate comprises from about 88 to 96 percent by weight of the aerosol composition and the propellant comprises from about 4 percent to 12 percent by weight of said aerosol composition.

13. A method for dyeing hair which comprises applying to the hair in the form of a relatively stable foam a tinctorially effective quantity of the aerosol composition of claim 11.

* * * * *

REEXAMINATION CERTIFICATE (80th)

United States Patent [19]

DeMarco

[11] B1 3,811,830

[45] Certificate Issued May 3, 1983

[54] STABLE OIL-IN-WATER EMULSION HAIR DYE COMPOSITION

[75] Inventor: Richard DeMarco, Cedar Heights, Conn.

[73] Assignee: Clairol Incorporated, New York, N.Y.

Reexamination Request
No. 90/000,212, Jun. 2, 1982

Reexamination Certificate for:
Patent No.: 3,811,830
Issued: May 21, 1974
Appl. No.: 131,426
Filed: Apr. 5, 1971

[51] Int. Cl.³ .............................................. A61K 7/13
[52] U.S. Cl. ... 8/405; 8/425; 8/428; 8/435; 8/501; 8/562; 8/609; 8/611; 424/70; 427/71
[58] Field of Search ... 8/405, 425, 428, 435, 501, 562, 609, 611, 936, 938; 424/70, 71

[56] References Cited

U.S. PATENT DOCUMENT 3,555,584   1/1971   Kalopissis et al. ............... 8/10.1

FOREIGN PATENT DOCUMENTS 1454314   8/1966   France.
1540998   8/1968   France.
1199641   7/1970   United Kingdom.

OTHER PUBLICATIONS

L'Oreal-Rege Superbe composition.

*Primary Examiner*—Donald B. Moyer

[57] ABSTRACT

A hair dye composition in the form of an oil-in-water emulsion in which the dye is dissolved or finely dispersed in the oil phase. The composition contains a coupling agent (e.g., water soluble alkylene glycols or alkylene glycol ether alcohols; long-chain fatty acid soaps; or long-chain fatty compound polyoxyalkyl or polyhydroxyalkyl derivatives) which impart stability to the emulsion. The composition may contain a propellant and be dispensed from an aerosol container.

REEXAMINATION CERTIFICATE ISSUED UNDER 35 U.S.C. 307.

THE PATENT IS HEREBY AMENDED AS INDICATED BELOW.

Matter enclosed in heavy brackets appeared in the patent, but has been deleted and is no longer a part of the patent; matter printed in italics indicates additions made to the patent.

AS A RESULT OF REEXAMINATION, IT HAS BEEN DETERMINED THAT:

Claims 5, 9 and 10 having been finally determined to be unpatentable, are cancelled Claims 1, 3, 6, 7, 8, and 11 are determined to be patentable as amended:

1. A hair dye composition comprising a stable oil-in-water emulsion in which the discontinuous oil phase is intimately distributed in the aqueous phase; said oil phase comprising about 1 to 4 percent by weight of a water-insoluble oil having dissolved therein or finely dispersed therein about 0.01 to 6 percent by weight of a water-insoluble direct dyeing hair dye; said composition containing about 3 to 18 percent by weight of a coupling agent which is partly soluble both in said oil phase and said aqueous phase whereby stability is imparted to said emulsion; said coupling agent being selected as to type and concentration so as to maintain the solubility of said dye in the aqueous phase below the level at which the dye would have greater affinity for the aqueous phase than the hair during a dyeing operation; said oil phase comprising an oily long-chain fatty derivative selected from the group consisting of compounds of the formula RX in which:

a. R is a long-chain hydrocarbon moiety having 8 to 20 carbon atoms; and
b. X is selected from the group consisting of

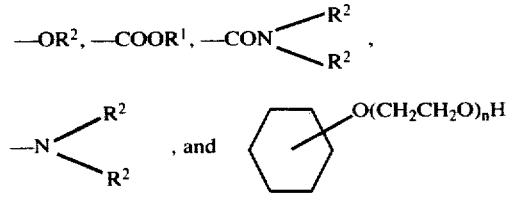

$R^1$ is an alkyl radical having 1 to 6 carbon atoms and $R^2$ is hydrogen or $-(CH_2CH_2O)_nH$, n having a value of from 1 to 6, glyceryl monooleate, sorbitan monolaurate, and propylene glycol monostearate; and wherein said coupling agent is a *combination of the following* water-soluble compounds [selected from the group consisting of]:

a. an alkylene glycol or an alkylene glycol ether alcohol of the formula:

$$R^5O(R^6O)_nR^7OH$$

wherein $R^5$ is H or alkyl having 1 to 4 carbon atoms and $R^6$ and $R^7$ are divalent alkylene radicals having 2 to 4 carbon atoms and n is a number from 0 to 150;

b. a long-chain fatty acid soap of the formula:

$$(R^8COO)_aM$$

wherein $R^8$ is the hydrocarbon moiety of a long-chain fatty acid having 10 to 20 carbon atoms, M is a monovalent or polyvalent salt-forming group and "a" is the valence of group M; *and* c. a long-chain polyoxyalkylated compound selected from the group consisting of a polyoxyalkylated long-chain fatty alcohol, a polyoxyalkylated polyhydroxyalkyl ester of a long-chain fatty acid; a polyoxyalkylated long-chain amine; a polyoxyalkylated long-chain fatty acid; a polyoxyalkylated long-chain fatty acid amide and a polyoxyalkylated long-chain alkyl phenol containing about 8 to 300 oxyalkyl groups in the structure [; and d. mixtures of said coupling agent].

3. A composition according to claim 1 wherein said [water soluble coupling agent] *long-chain polyoxyalkylated compound* is a polyoxyalkylated long-chain fatty acid amide of the formula:

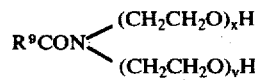

in which $R^9$ is the hydrocarbon moiety of a long-chain fatty acid having from 10 to about 20 carbon atoms and x and y being numbers from about 0 to 300; the sum of x + y being about 8 to 300.

6. A composition according to claim [5] *1* wherein the coupling agent comprises a. 1 to 15 percent by weight based on the total weight of the composition of said alkylene glycol and alkylene glycol ether alcohol;
b. 0.5 percent to 6 percent by weight based on the total weight of the composition of said long-chain fatty acid soap; and
c. 0.5 to 6 percent by weight based on the total weight of the composition of said long-chain polyoxyalkylated compound.

7. A hair dye composition comprising a stable oil-in-water emulsion in which the discontinuous oil phase is intimately distributed in the aqueous phase; said oil phase comprising about 1 to 4 percent by weight of a water-insoluble oil having dissolved therein or finely dispersed therein about 0.01 to 6 percent by weight of a water-insoluble direct dyeing hair dye; said composition containing about 3 to 18 percent by weight of a coupling agent which is partly soluble both in said oil phase and said aqueous phase whereby stability is imparted to said emulsion; said coupling agent being selected as to type and concentration so as to maintain the solubility of the dye in the aqueous phase below the level at which the dye would have greater affinity for the aqueous phase than the hair during a dyeing operation; and wherein said water-insoluble oil is:

a. a fatty acid alkanol amide of the formula:

in which $R^3$ is the hydrocarbon moiety of a long-chain fatty acid containing about 10 to 20 carbon atoms and $R^4$ is hydrogen or hydroxyethyl; and where in *said coupling agent is a combination of the following water-soluble compounds*:

i. an alkylene glycol or an alkylene glycol ether alcohol of the formula:

$$R^5O(R^6O)_nR^7OH$$

wherein $R^5$ is H or alkyl having 1 to 4 carbon atoms and $R^6$ and $R^7$ are divalent alkylene radicals having 2 to 4 carbon atoms and n is a number from 0 to 150;

ii. a long-chain fatty acid soap of the formula:

$$(R^8COO)_aM$$

wherein $R^8$ is the hydrocarbon moeity of a long-chain fatty acid having 10 to 20 carbon atoms, M is a monovalent or polyvalent salt-forming group and "a" is the valence of group M; and iii. [b. the coupling agent is] a water-soluble fatty acid polyoxyalkylated amide of the formula:

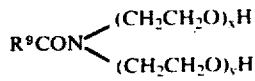

in which $R^9$ is the hydrocarbon moiety of a long-chain fatty acid having from 10 to 20 carbon atoms and x and y are numbers from about 0 to 300, the sum of x + y being about 8 to 300.

8. A [hair dye] composition *according to claim 1*, [comprising a stable oil-in-water emulsion in which the discontinuous oil phase is intimately distributed in the aqueous phase; said oil phase comprising about 1 to 4 percent by weight of a water-insoluble oil having dissolved therein or finely dispersed therein about 0.01 to 6 percent by weight of a water-insoluble direction dyeing hair dye; said composition containing about 3 to 18 percent by weight of a coupling agent which is partly soluble both in said oil phase and said aqueous phase whereby stability is imparted to said emulsion; said coupling agent being selected as to type and concentration so as to maintain the solubility of the dye in the aqueous phase below the level at which the dye would have greater affinity for the aqueous phase than the hair during a dyeing operation; and] wherein said water-insoluble oil is a fatty acid alkanol amide of the formula:

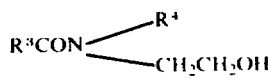

wherein $R^3$ is the hydrocarbon moiety of a long-chain fatty acid containing from about 10 to 20 carbon atoms and $R^4$ is hydrogen or hydroxyethyl [; and wherein the coupling agent is a water-soluble alkylene glycol or alkylene glycol ether alcohol of the formula:

$$R^5O(R^6O)_nR^7OH$$

wherein $R^5$ is H or alkyl having 1 to 4 carbon atoms and $R^6$ and $R^7$ are divalent alkylene radicals having 2 to 4 carbons atoms and n is a number from 0 to 150].

11. An aerosol composition in an aerosol container comprising a concentrate and a propellant, said propellant being present in sufficient quantity and under sufficient pressure so as to propel said concentrate out of said container as a foam when the aerosol container is actuated, said concentrate being a hair dye composition comprising a stable oil-in-water emulsion in which the discontinuous oil phase is intimately distributed in the aqueous phase; said oil phase comprising about 1 to 4 percent by weight of a water-insoluble oil having dissolved therein or finely dispersed therein about .01 to 6 percent by weight of a water-insoluble direct dyeing hair dye; said composition containing about 3 to 18 percent by weight of a coupling agent which is partly soluble both in said oil phase and said aqueous phase whereby stability is imparted to said emulsion; said coupling agent being selected as to type and concentration so as to maintain the solubility of said dye in the aqueous phase below the level at which the dye would have greater affinity for the aqueous phase than the hair during a dyeing operation; said oil phase comprising an oily long-chain fatty derivative selected from the group consisting of compounds of the formula RX in which:

a. R is a long-chain hydrocarbon moiety having 8 to 20 carbon atoms; and b. X is selected from the group consisting of

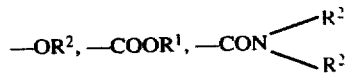

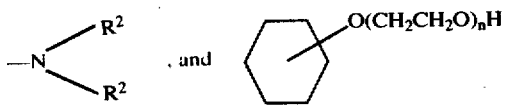

$R^1$ is an alkyl radical having 1 to 6 carbon atoms and $R^2$ is hydrogen or —$(CH_2CH_2O)_nH$, n having a value of from 1 to 6, glyceryl monooleate, sorbitan monolaurate, and propylene glycol monostearate; and wherein said coupling agent is a *combination of the following* water-soluble compounds [selected from the group consisting of]:

a. an alkylene glycol or an alkylene glycol ether alchohol of the formula:

$$R^5O(R^6O)_nR^7OH$$

wherein $R^5$ is H or alkyl having 1 to 4 carbon atoms and $R^6$ and $R^7$ are divalent alkylene radicals having 2 to 4 carbon atoms and n is a number from 0 to 150;

a. a long-chain fatty acid soap of the formula:

$$(R^8COO)_aM$$

wherein $R^8$ is the hydrocarbon moiety of a long-chain fatty acid having 10 to 20 carbon atoms, M is a monovalent or polyvalent salt-forming group and "a" is the valence of group M; *and* c. a long-chain polyoxyalkylated compound selected from the group consisting of a polyoxyalkylated long-chain fatty alcohol, a polyoxyalkylated polyhydroxyalkyl ester of a long-chain fatty acid; a polyoxyalkylated long-chain amine; a polyoxyalkylated long-chain fatty acid; a polyoxyalkylated long-chain fatty acid amide and a polyoxyalkylated long-chain alkyl phenol containing about 8 to 300 oxyalkyl groups in the structure [and d. mixtures of said coupling agents].

Claims 2, 4, 12 and 13, dependent on amended claims, are determined to be patentable.

\* \* \* \* \*